US008538195B2

(12) United States Patent
Robinson (10) Patent No.: US 8,538,195 B2
(45) Date of Patent: Sep. 17, 2013

(54) HYPERSPECTRAL IMAGE DIMENSION REDUCTION SYSTEM AND METHOD

(75) Inventor: Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 1318 days.

(21) Appl. No.: 11/856,588

(22) Filed: Sep. 17, 2007

(65) Prior Publication Data

US 2009/0074297 A1    Mar. 19, 2009

(51) Int. Cl.
*G06K 9/36* (2006.01)
(52) U.S. Cl.
USPC ........................... 382/276; 382/298; 382/299
(58) Field of Classification Search
USPC ........................................................ 382/276
See application file for complete search history.

(56) References Cited

U.S. PATENT DOCUMENTS

| | | |
|---|---|---|
| 6,075,891 A | 6/2000 | Burman |
| 6,665,438 B1 | 12/2003 | Lin ................. 382/191 |
| 6,701,021 B1 | 3/2004 | Qian et al. ............ 382/253 |
| 6,750,964 B2 | 6/2004 | Levenson et al. .......... 356/326 |
| 6,782,138 B1 | 8/2004 | Leisner et al. ............ 382/276 |
| 6,804,400 B1 | 10/2004 | Sharp |
| 6,859,275 B2 | 2/2005 | Fateley et al. |
| 6,940,999 B2 | 9/2005 | Lin ................. 382/103 |
| 6,952,499 B1 | 10/2005 | Vititoe .............. 382/224 |
| 7,180,588 B2 | 2/2007 | Geshwind et al. |
| 7,194,111 B1 | 3/2007 | Schaum et al. |
| 7,197,111 B2 | 3/2007 | Rose et al. ................ 382/103 |
| 7,251,376 B2 | 7/2007 | Qian et al. ............... 382/253 |
| 7,356,201 B2 | 4/2008 | Gunther et al. |
| 7,463,778 B2 | 12/2008 | Damera-Venkata |
| 7,486,734 B2 | 2/2009 | Machida |
| 7,680,337 B2 | 3/2010 | Gruninger et al. |
| 7,773,828 B2 | 8/2010 | Sakata et al. |
| 8,150,195 B2 | 4/2012 | Demirci et al. |
| 8,165,344 B2 | 4/2012 | Shirasaka |
| 8,175,393 B2 | 5/2012 | Robinson et al. |
| 8,315,472 B2 | 11/2012 | Robinson et al. |
| 8,391,961 B2 | 3/2013 | Levenson et al. |
| 2003/0012398 A1* | 1/2003 | Sunshine et al. ............ 382/100 |

(Continued)

FOREIGN PATENT DOCUMENTS

CN    101763445 A    6/2010

OTHER PUBLICATIONS

Michael Winter, Comparison of Approaches for Determining Endmembers in Hyperspectral Data, IEEE 2000.*

(Continued)

*Primary Examiner* — Chan S Park
*Assistant Examiner* — Mark Roz
(74) *Attorney, Agent, or Firm* — Pierce Atwood LLP; Joseph M. Maraia (57) ABSTRACT

Provided is a method of hyperspectral image dimension reduction. The method includes receiving a hyperspectral image having a plurality of pixels. A set of basis vectors is established at least in part with respect to the spectral vectors of the initial hyperspectral image. For each pixel of the hyperspectral image, the spectral vector is read and decomposed, i.e. unmixed, with the basis vector set to provide at least a reduced dimension vector for each pixel. Collectively the reduced dimension vectors for each pixel represent the dimensionally reduced image. A system operable to perform the method is also provided.

13 Claims, 6 Drawing Sheets

(56) References Cited

U.S. PATENT DOCUMENTS

| | | |
|---|---|---|
| 2004/0218172 A1 | 11/2004 | DeVerse et al. |
| 2006/0247514 A1 | 11/2006 | Panasyuk et al. |
| 2009/0074297 A1 | 3/2009 | Robinson |
| 2010/0303371 A1 | 12/2010 | Robinson et al. |
| 2012/0224782 A1 | 9/2012 | Robinson et al. |

OTHER PUBLICATIONS

Antonio Plaza et al, A Quantitative and Comparative Analysis of Endmember Extraction Algorithms From Hyperspectral Data, IEEE 2004.*

Joseph W. Boardman et al, Mapping Target Signatures Via Partial Unmixing of Aviris Data, Citeseer 1995.*

Michael Winter, N-FINDR: an algorithm for fast autonomous spectral end-member determination in hyperspectral data, SPIE 1999.*

Derek M. Rogge, et al, Iterative Spectral Unmixing for Optimizing Per-Pixel Endmember Sets. IEEE 2006.*

Ian S. Robinson, et al. "Comparison of Hyperspectral Sub-Pixel Detection With and Without a Priori Knowledge of Target Features"; Aerospace Conference, 1998 IEEE Snowmass at Aspen, Colorado, Mar. 21-28, 1998; vol. 5, pp. 183-189; Mar. 21, 1998; XP010287059; ISBN 978-0-7803-4311-5.

Keshava Nirmal, et al. "Spectral Unmixing"; IEEE Signal Processing Magazine; vol. 19, No. 1; pp. 44-57; Jan. 1, 2002; XP011093745.

International Search Report for International Patent Application No. PCT/US2008/2-083738, dated Feb. 9, 2009.

Sun, L., et al., "Improved Iterative ERror Analysis for Endmember Extraction from Hyperspectral Imagery", SPIE Imaging Spectrometry XIII, vol. 708, pp. 400-407, Intro., Sec. 2.2—pp. 3-5 (Aug. 2008).

Rogge, D. M., et al., "Iterative Spectral Unmixing for Optimizing Per-Pixel Endmember Sets", IEEE Transactions on Geoscience and Remote Sensing, IEEE Service Center, vol. 44, No. 12, pp. 3725-3736 (Dec. 2006).

Veganzones, M. A., et al., "Endmember Extraction Methods: A Shrot Review", pp. 400-407 (Sep. 2008).

PCT/US2010/024192 filed Feb. 12, 2010, Partial Intl. Search Report dated Feb. 21, 2011 (9 pages).

Duran, O., et al., "A Time-Efficient Method for Anomaly Detection in Hyperspectral Images", IEEE Transactions on Geoscience and Remote Sensing, IEEE Service Ctr., NJ, US, vol. 45, No. 12, pp. 3894-3904 (Dec. 2007).

Plaza, A., et al., "Spatial/Spectral Endmember Extraction by Multidimensional Morphological Operations", IEEE Transactions on Geoscience and Remote Sensing, IEEE Service Ctr,, NJ, US, vol. 40, No. 9, pp. 2025-2041 (Sep. 2002).

Plaza, A., et al., "A New Approach to Mixed Pixel Classification of Hyperspectral imagery based on extended Morphological Profiles", Pattern Recognition, Elsevier, vol. 37, No. 6, pp. 1097-1116 (Jun. 2004).

Rogge, D. M., et al., "Integration of spatial-spectral information for the improved extraction of endmembers", Remote Sensing of Environment, Elsevier, vol. 110, No. 3, pp. 387-303 (Aug. 2007).

Filippi, A. M., et al., "Support Vector Machine-Based Endmember Extraction", IEEE Transactions on Geoscience and Remote Sensing, IEEE Service Ctr., NJ, US, vol. 47, No. 3, pp. 771-791 (Mar. 2009).

Intl Search Report & Written Opinion dated Apr. 27, 2011 of PCT/US2010/024192 filed Feb. 12, 2010 (18 pages).

Intl. Preliminary Report on Patentability dated Aug. 29, 2011 of PCT/US2010/024192 filed Feb. 12, 2010 (21 pages).

Manolakis et al,, "Is There a Best Hyperspectral Detection Algorithm?", SPIE—Newsroom; pp. 1-3 (2209).

Kuybeda, O., et al., Global Unsupervised Anomaly Extraction and Discrimination in Hyperspectral Images via Maximum Orthogonal-Complements Analysis, Feb. 2008, Department of Electrical Engineering Technion IIT, Haifa 32000, Israel, Retrieved from Internet<URL: http://webee.technion.ac.il/uploads/file/publication/684.pdf.

Ulug Bayazit, "Region Adaptive Spectral Transformation for Wavelet Based Color Image Compression", Image Processing (CIP), 2009 16th IEEE International Conference on. IEEE, Piscataway, NJ, Nov. 7, 2009, pp. 2817-2820, Section 2 and 3.

Dohyun Ahn et al., "Rate-Distortion Optimized Image Compression Using Generalized Principal Component Analysis", Acoustics, Speech and Signal Processing, 2006. ICASSP 2006 Proceedings, 2006 IEEE International Conference on Toulouse, France 14-19, May 14, 2006, pp. 5-8.

Memarsadeghi, N et al, "A Fast Implementation of the Isodata Clustering Algorithm", IJCGA, vol. 17, No. 1, pp. 71-103 (2007).

Wei, C-P, et al., "Empirical Comparison of Fast Clustering Algorithms for Large Data Sets", Proceedings of the 33rd Hawaii Int'l Conf, on System Sciences, pp. 1-10 (2000).

Yan, D. et al., "Fast Approximate Spectral Clustering", KDD'09, (9 pages) Jun. 28-Jul. 1, 2009, Paris, France.

Meza et al., "Applied Non-Uniformity Correction Algorithm for Striping Noise Removal in Hyperspectral Images", [Downloaded from the Internet: http://nuc.die.udec.ci/publications/papers/2010-NUCStrippingNoise.pdf on Nov. 20, 2012].

Jiang, Ming-Fei, et al., "A Robust estimation of Virtual Dimensionality in Hyperspectral Imagery," Computational Problem-Solving (ICCP), 2010 International Conference on, vol., No., pp. 374-378, Dec. 3-5, 2010.

Harsanyi, Joseph C., et al., "Hyperspectral image Classification and Dimensionality Reduction: An Orthogonal Subspace Projection Approach," ZEEE Tmns. On Geoscience and Remote Sensing, 32(4), Jul. 1994.

Neville, R.A., et al., "Automatic Endmernber Extraction from Hyperspectral Data for Mineral Exploration", 4th Int. Airborne remote Sensing Conf. Exhibition/21st Canadian Symposium on Remote Sensing, pp. 891-896 (1999).

Orthogonality and Least Squares, http://www.aerostudents.com/files/linearAlgebra/orthogonalityLeast Squares.pdf, Jul. 2009.

Marco F, Durarte et al., "Structured Compressed Sensing: From Theory to Applications" IEEE Transactions on Signal Processing, IEEE Service Center, New York, vol. 59, No. 9, Sep. 1, 2011.

Pickering M R et al., "Compression of Hyperspectral Data Using Vector Quantisation and the Discrete Cosine Transform", Image Processing, 2000, Proceedings. 2000 International Conference of Sep. 10-13, 2000, IEEE, Piscataway, NJ, Sep. 10, 2000, pp. 195-198, vol. 2.

Manolakis et al., "Hyperspectral Image Processing for Automatic Target Detection Applications,", http://wwvv.cis.rit.edu/-cnspci/references/dip/manolakis2003.pdf, 2003.

Leathers et al., "Scene-based Nonuniformity Corrections for Optical and SWIR Pushbroom Sensors", Optics Express; 13(13): 5136-5150 (Jun. 27, 2005).

* cited by examiner

HYPERSPECTRAL IMAGE DIMENSION REDUCTION SYSTEM AND METHOD

FIELD

This invention relates generally to the field of hyperspectral image processing, and in particular to a system and method for hyperspectral image dimension reduction such as may be desired for data transmission or simplified processing.

BACKGROUND

A black and white photograph of an object or a geographic area is a two dimensional construct of the actual image or area—for each X and Y coordinate in the image there is a single value blackness or whiteness of that particular image spot. As human beings, the eye can perceive useful information about objects or areas based on the differences between black, white, and the shades of gray.

Color photographs add more visual information, but for most purposes the color information that is represented is tied to the visual spectrum. For each X and Y coordinate in the image there is an approximation of the visual color spectrum of that particular image spot created through the blending of three color values, such as for example Red Green and Blue.

Multispectral sensing systems such as the Landsat Thematic Mapper remote imager and weather satellites produce images with a few relatively broad wavelength bands. The imager may capture a visual spectrum image and also one in infrared, but still they are limited in their ability to perceive information that may otherwise be present in a different part of the spectrum.

Hyperspectral sensors, on the other hand, collect image data across dozens if not hundreds of spectral bands, combining the technology of spectroscopy and remote imaging. The measurements captured by hyperspectral sensors make it possible to derive a contiguous spectrum for each image pixel. In other words for each X and Y coordinate of a pixel, rather than a single value for a gray or visible color, there is a third dimension—a vector, providing distinct information for that particular pixel across the large spectrum of wavelengths.

As different materials will reflect wavelengths of visible and invisible light selectively, analysis of the contiguous spectrum permits finer resolution and greater perception of information contained in the image, by separating and evaluating different wavelengths. For example, inorganic materials such as minerals, chemical compositions and crystalline structures control the shape of the spectral curve and the presence and positions of specific absorption bands.

The spectral reflectance curves of healthy green plants also have a characteristic shape that is dictated by various plant attributes, such as the absorption effects from chlorophyll and other leaf pigments. Leaf structure varies significantly between plant species, and can be affected by plant stress. Therefore species type, plant stress and canopy state can all affect near infrared reflectance measurements, which are captured by hyperspectral sensors.

In addition, for a given pixel, a combination of different materials, e.g., biological, chemical, mineral, will provide a composite signal. Upon analysis, and through comparison to known signal waveforms it is frequently possible to derive the presence of materials within a pixel, and therefore appreciate a detection granularity that is greater than the actual pixel resolution.

Hyperspectral sensors providing hyperspectral imaging can therefore be beneficially applied in a wide array of practical applications. Examples of such uses include aid in the detection of chemical or biological weapons, bomb damage assessment of underground structures, drug production and cultivation, as well as the detection of friend or foe troops and vehicles beneath foliage or camouflage.

With each pixel having information for a spectrum of wavelengths, it is not surprising that hyperspectral images are represented by vast quantities of data. As the hyperspectral sensors are often located remotely, such as in satellites or in aircraft, the transmission of the data can be an issue as the volume of data can be enormous and transmission of such data to ground stations typically involve a radio transmission having a limited frequency bandwidth.

More specifically, the technical increases in hyperspectral sensors to capture images with greater spatial content, increased resolution, and/or across greater wavelength spectrums has raised the total data volume to the point where data latency is a problem and a limiting factor in the distribution of near real time information. When the imaged area corresponds to a disaster area, such as coast lines ravaged by a tsunami, a combat zone, or a terrorist strike upon a target, real time transfer and processing is key to the prevention of loss of life and property.

In addition, for some applications there is great advantage to the data being processed at the location where the data is collected and for the processing results and/or selected subsets of the data to be transmitted to users. Given the size of the data set corresponding to a hyperspectral image, in many instances localized processing may significantly tax localized resources and/or lead to an even greater delay in transmitting the data to a user.

One option to increase transmission rate is to increase the usable communications bandwidth. Such an increase typically requires additional power at the transmission source. For existing satellites and even future satellites where power sources are limited, increasing bandwidth is not ideal. Another option to increase transmission rate is to actually reduce the volume of data that is being transmitted. A common measure for such reduction is compression, which may be performed in one of two forms—lossless and lossy.

A related function is data dimensionality reduction (DIMRED). DIMRED is similar to compression in that the volume of data is reduced. It differs from compression in that the intent of DIMRED is to enable further processing of the data (e.g. to detect targets, to measure changes in successive images of the same scene) without decompressing the data set. As with compression, however, contemporary methods for data dimension reduction suffer drawbacks that are often quite undesirable.

Typically, prior art methods DIMRED methods include forming a data set of many fewer spectral bands by merging or selecting a subset of spectral bands of a hyperspectral data cube or the use of principal components analysis (PCA) to create basis vectors. In the latter case the eigenvectors and corresponding eigenvalues of the hyperspectral data set are computed. B basis vectors are selected by choosing the B eigenvectors with the B largest eigenvalues. Other techniques have been employed to reduce scene dimension based on linear unmixing.

It is well known that most hyperspectral images can be well represented by the linear superposition of the spectra of the mixture of materials found in each spatial pixel. As such, if the spectra for those materials are known then a linear algebra technique known as unmixing can be applied to find the abundance of each spectrum in each pixel. The abundance or unmixing coefficients can then be used to represent the information content of each pixel.

However, and quite importantly, most of the time the constituent spectra of the scene are not known a priori. Some prior art algorithms attempt to compute these pure material spectra from the spectra of mixed pixels in the scene. Other prior art has found mathematical basis functions that can be superimposed to represent each pixel. Examples of such methods include: the Orassis algorithm that fits an optimal convex hull around the high dimensionality data trying to find the endmembers or vertices of the hull; the Nfindr technique by Winter attempts to find the spectrally purest pixels and make them endmembers; and the Max D technique from RIT which is similar to NFINDR. The commercial tool ENVI offers various versions of the Principal Components Analysis (PCA).

The pixel purity and endmember techniques have degraded or limited performance when pure pixels are not found in the scene and offer less efficient reduction/compaction than Principal Components and the present invention. They also do not control either the average pixel error or the worst case pixel error; the latter being very important if subsequent processing is going to detect anomalies.

The Residual correlation method from BAE applies endmember selection criteria that are subjective and rely on lab or a priori spectra. ENVI and other processing tools offer analysts the option to select pixels from a scene manually to be used as endmembers. Analyst selections are subjective and do not control the errors in a predictable or optimal fashion.

An overview of many of these techniques can be found in the following references. Winter, Michael E., "N-FINDR: an Algorithm for Fast Autonomous Spectral End-member Determination in Hyperspectral Data", Proc of SPIE Vol 3753, *Imaging Spectrometry V* (Descour and Shen editors) pp 266-277, 1999; Keshava, Nirmal, *A Survey of Spectral Unmixing Algorithms*, LINCOLN LABORATORY JOURNAL VOLUME 14, NUMBER 1, 2003; Robinson Ian S. et al., "Target Detection Using HSI Systems: An Update Of TRW Results", in *Imaging Spectrometry IV*, S Shen and M R Descour, Eds., SPIE Vol 3438, San Diego, Calif., July 1998; and McGregor, Dan. et al., *Comparison of Hyperspectral Sub-Pixel Detection With and Without A Priori Knowledge of Target Features*, 1998 IEEE Aerospace Conf. Proc., Vol. 5, Snow Mass Colo., March 1998.

Moreover, PCA analysis is generally effective in creating basis vectors that span the scene in a mean-square sense. However, PCA does not directly control the error levels of fidelity of individual spectra. Thus it is possible, and even likely, to incur a large error in a small fraction of the scene, especially when and where the pixels are uncommon. This error can be extremely detrimental when the detection problem is for spectrally unique objects that sparsely populate the scene. In addition, PCA analysis typically requires high overhead including computation and inversion of the spectral covariance matrix.

Lossless data compression is a class of data compression algorithms that permits the extraction of the original data from the compressed data to be complete, i.e., the restored data is exactly the same as the original data. Lossless algorithms typically are categorized according to the type of data that they are designed to compress, such as text, images and sound. Zip and gzip file formats are common lossless applications for data, and PNG and GIF are frequently used for images.

While in principle, any general-purpose lossless compression algorithm can be used on any type of data, many lossless algorithms are unable to achieve significant compression, especially on data that is not of the form they were designed to compress. There is no guaranteed compression factor for lossless compression. In certain cases the output from such a lossless algorithm may actually be larger then the original.

Lossy data compression is a class of data compression algorithms where compressing data and then decompressing provides a new data stream that may well be different from the original, but close enough to be useful for one or more applications. Lossy methods are frequently employed rather than lossless methods because the compressed file size is far smaller while still meeting the requirements of the application.

Common examples of lossy compressed data files are JPEG image files and MP3 audio files. JPEG is designed specifically to provide images that respond well to the human eye. With JPEG, the image is converted from RGB (Red Green Blue) into the YCbCr color space, wherein Y represents the brightness of a pixel, the Cb and Cr respectively represent chrominance as split into blue and red components.

As the human eye sees more detail in the Y component of brightness then in the Cb (blue) and Cr (red), JPEG downsamples the Cb and Cr elements. JPEG also performs a normalized, two-dimensional type II discrete cosine transform to further reduce the data. MP3 compression likewise removes data that is not likely to be perceived by the human user. However, the removal of data in both JPEG and MP3 compression methods does result in new files that although acceptable to human users may not be acceptable for computer processing and analysis. More specifically, JPEG, MP3 and other lossy compression methods may well remove information that is valuable and desired, but potentially not realized to be so until processing and analysis is attempted.

As hyperspectral image data is quite large due to the wavelength spectrum captured, most lossless compression methods have not proven to be truly effective in balancing compression desirability while maintaining important data. This is especially true where a factor involved in the compression method is unrelated to the data of the image itself, and/or where the method is highly dependent on statistical repetition of the data and the ability to represent a statistical group of pixels with a token representative.

As indicated above, with hyperspectral images it is very often possible to infer information from a single pixel so as to determine the presence of materials within the area of a pixel, e.g., a camouflaged tank or missile below a canopy of foliage, even when the detected element is smaller than the resolution of the pixel. When a compression system removes data from the pixel, this desirability for material detection may be inadvertently hampered.

Hence there is a need for an image dimension reduction system and method suitable for use with hyperspectral images that overcome one or more of technical problems noted above.

SUMMARY

This invention provides a system and method for hyperspectral image dimension reduction.

In particular, and by way of example only, according to one embodiment of the present invention, provided is a method of hyperspectral image dimension reduction, including: receiving a hyperspectral image having a plurality of pixels and establishing a basis vector (BV) set. For each of the plurality of pixels, the spectral vector is read from the pixel. The spectral vector is then decomposed with the BV set to provide a reduced dimension vector for the pixel. The provided output is a dimension reduced image consisting of the reduced data vectors for each pixel.

In at least one alternative embodiment, provided is a method of hyperspectral image dimension reduction, including: receiving a hyperspectral image having a plurality of pixels and establishing a basis vector (BV) set. The BV set is established by selecting an initial pixel and reading the spectral vector for the initial pixel as an initial basis vector (BV) of the set. For each of the remaining plurality of pixels taken in turn, each spectral vector is read and unmixed with the BV set to determine a residual vector. In response to the magnitude of the residual vector being greater than a threshold, adding the spectral vector to the BV set. With the BV set so established, then returning to read the spectral vector from the pixel once again. In this pass the spectral vector is unmixed with the BV set to provide an alpha vector and a residual vector for the pixel. The provided output is a dimension reduced image consisting of at least the alpha vector for each pixel.

In yet another embodiment, provided is a system for hyperspectral image dimension reduction. The system includes an interface operable to receive at least a hyperspectral image having a plurality of pixels; a spectrum reader operable to read a spectral vector for each pixel; a pool operable to provide a basis vector (BV) set having at least one basis vector; a decomposer operable to decompose the spectral vector of each pixel with at least one basis vector and provide a result; and an evaluator in connection with the pool and decomposer and operable in at least a first instance to compare the result to a threshold value, and operable in at least a second instance to provide an alpha vector and a residual vector for each pixel.

DETAILED DESCRIPTION

Before proceeding with the detailed description, it is to be appreciated that the present teaching is by way of example only, not by limitation. The concepts herein are not limited to use or application with a specific type of problem solving system. Thus, although the instrumentalities described herein are for the convenience of explanation, shown and described with respect to exemplary embodiments, it will be appreciated that the principles herein may be applied equally in other types of image dimension reduction systems and method.

Figure 1:
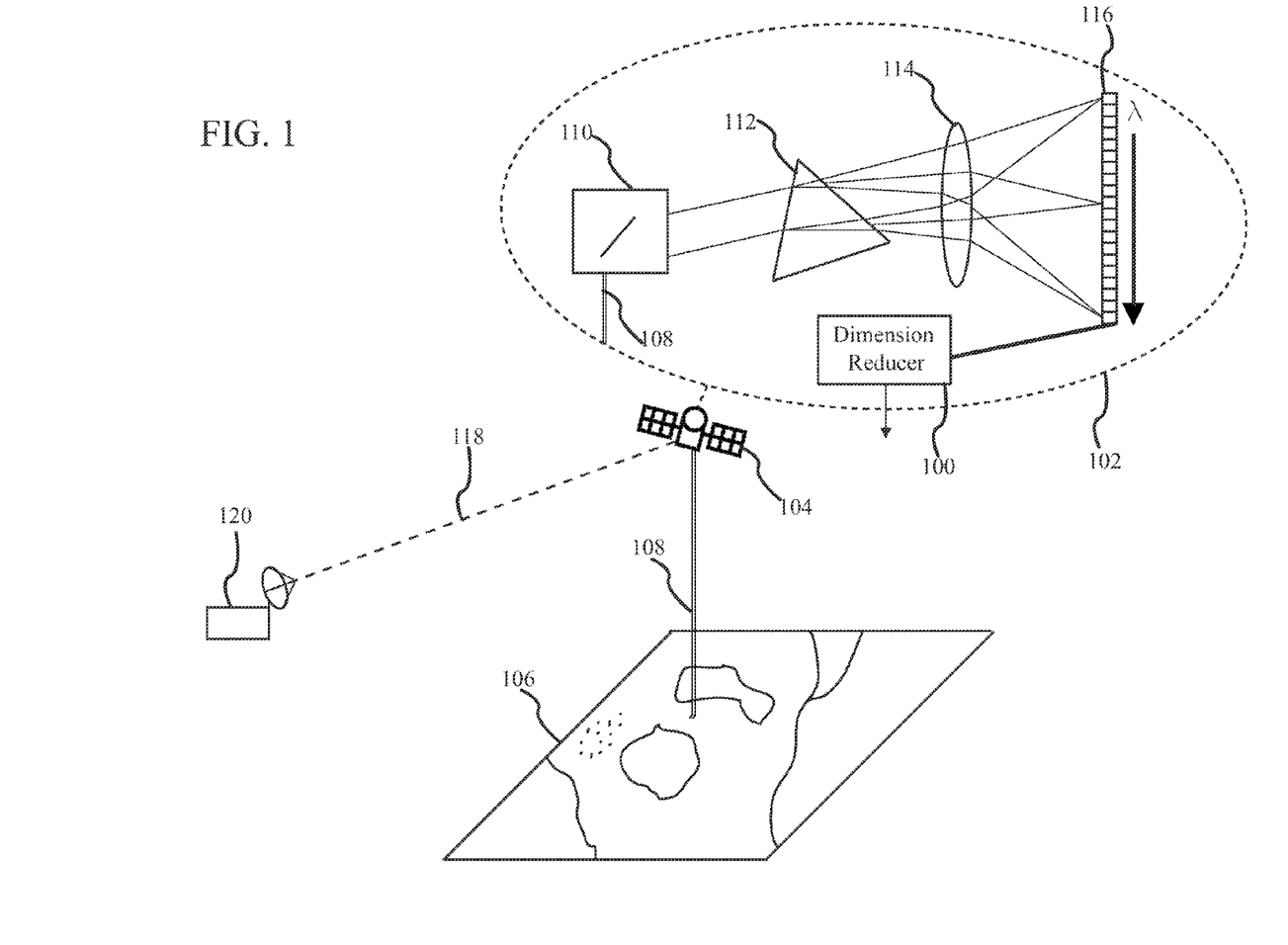
FIG. 1 illustrates a simplified diagram of a hyperspectral imaging system including an embodiment of the hyperspectral image dimension reduction system of the present invention.

FIG. 1 illustrates an exemplary image dimension reduction system ("IDRS") 100 incorporated as part of a hyperspectral image system 102 provided by a satellite 104. The satellite 104 is tasked to image a geographical area 106, and in so doing receives light 108 from a single ground-resolution cell. To generalize the basic elements provided by a hyperspectral image system 102 and the general method of operation, the light 108 is received by scan mirrors 110 and or other optics that direct the light through at least one dispersing element 112.

The dispersing element separates wavelengths and provides them to imaging optics 114 which in turn focus the wavelengths upon an array of detectors 116 arranged to capture data information across a spectrum of wavelengths. The hyperspectral data is then processed by IDRS 100 for transmission 118 to a ground station 120.

As is further described below, the degree of dimension reduction and classification as lossy or lossless is an adjustable feature of IDRS 100. Further, the transmitted dimension reduced data 118 is suitable for immediate processing without requiring reconstruction of the original data, or an approximation of the original data.

Figure 2:
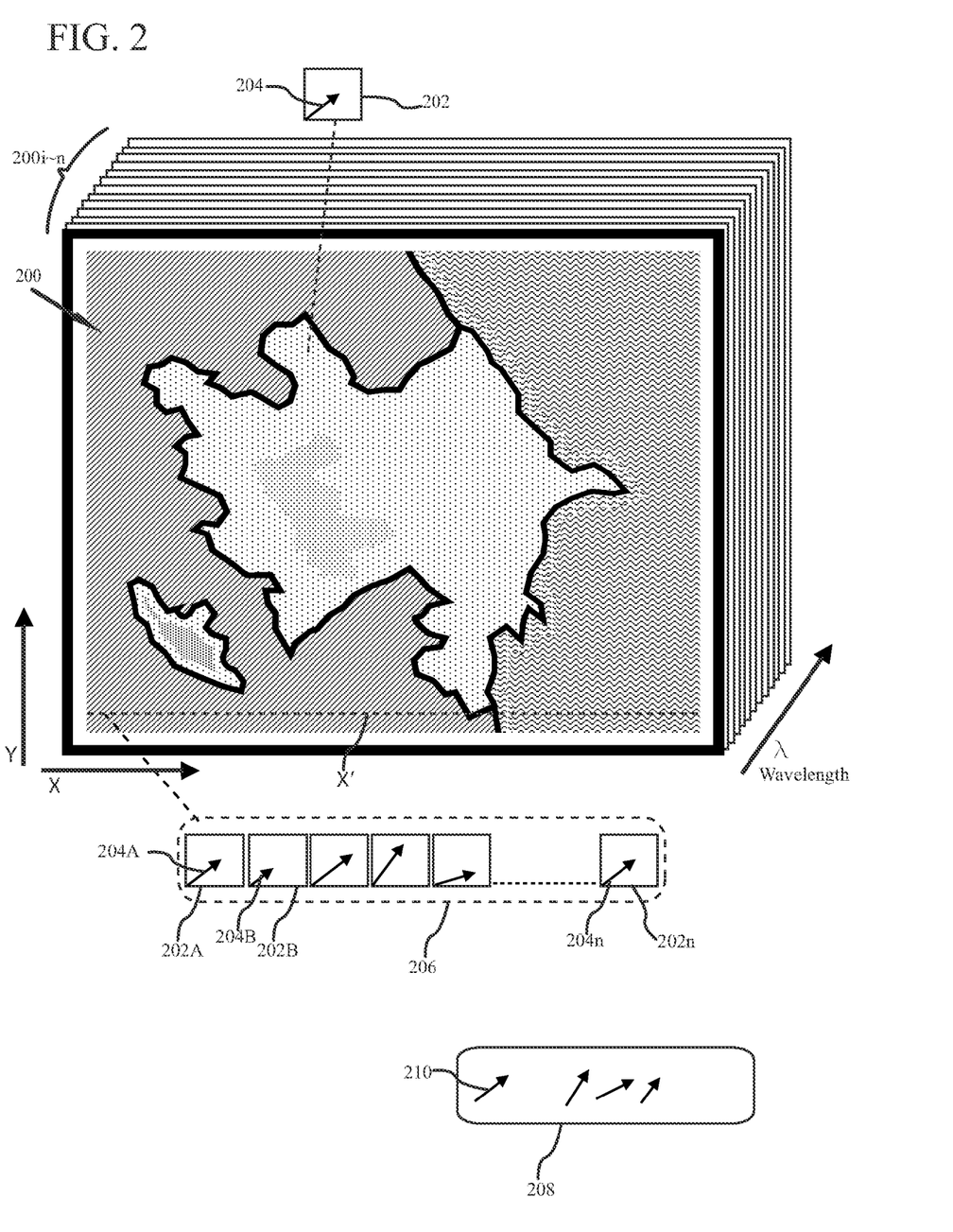
FIG. 2 is an exemplary hyperspectral image as may be dimensionally reduced in accordance with at least one embodiment of the present invention.

FIG. 2 is a further representation of the image 200, and specifically images? 200$i$~$n$, acquired simultaneously in many different adjacent wavelength bands. As indicated, the image is comprised of pixels arranged in an X-Y coordinate system. Under appropriate circumstances, alternative coordinate systems may be employed, however X-Y is represented herein for ease of illustration and discussion, and not by way of limitation. Each pixel 202 has a spectral vector 204. The spectral vector contains at least some number of spectral measurements of the energy upwelling from that pixel. As indicated in the enlarged section 206, of row X' the spectral vector 204A of the initial pixel 202A may well be different from the spectral vectors 204B~204$n$ for pixels 202B~202$n$. As is also shown in FIG. 2, a basis vector (BV) set 208 is provided, and is shown to have an initial basis vector 210. In contrast to the limitations of the principal component analysis (PCA) methods discussed above, IDRS 100 permits control of the error levels and/or fidelity of individual spectra, and as such is highly advantageous when the detection problem is for spectrally unique objects that sparsely populate the scene. In addition, the present invention as embodied in IDRS 100, derives basis vectors using no a priori knowledge. The basis vectors span the background materials and (statistically sparse) targets in the scene. The basis vectors may be endmembers (e.g. pixel spectra) or may have no physical interpretation. The reduced dimensionality data can control maximum error on each pixel. The number of basis vectors is minimized for a given maximum error level on a per pixel basis. User/Analyst selected spectra can be directly added to the basis vector set. Spectra collected or measured a priori can be added to the basis vector set. The reduced dimensionality scene can be processed using all hyperspectral (vector-type) processing. The computation of the reduced dimensionality scene is faster than prior art techniques with comparable levels of reduction. The determination and/or establishment of the BV set 208 and at least the initial basis vector 210 is further discussed below.

Figure 3:
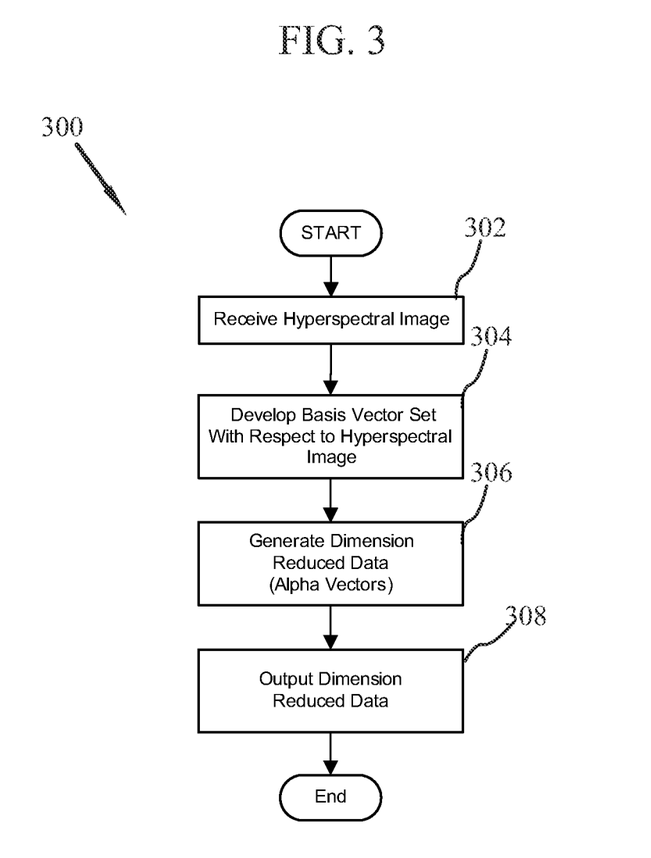
FIG. 3 is block diagram of a hyperspectral image dimension reduction system in accordance with at least one embodiment of the present invention.

The method of hyperspectral image dimension reduction 300 is presented at a high level in FIG. 3. It is understood and appreciated that the method need not be performed in the order herein described, but rather is presented for ease of discussion and illustration in accordance with at least one embodiment.

Moreover, in at least one embodiment, a hyperspectral image is provided, block 302. A BV set 208 is developed with respect to the hyperspectral image, block 304. Then, with the BV set established, each pixel is decomposed with the BV set to provide a plurality of alpha vectors, block 306. These alpha vectors are provided as the reduced data set of the output scene, block 308.

Figure 4:
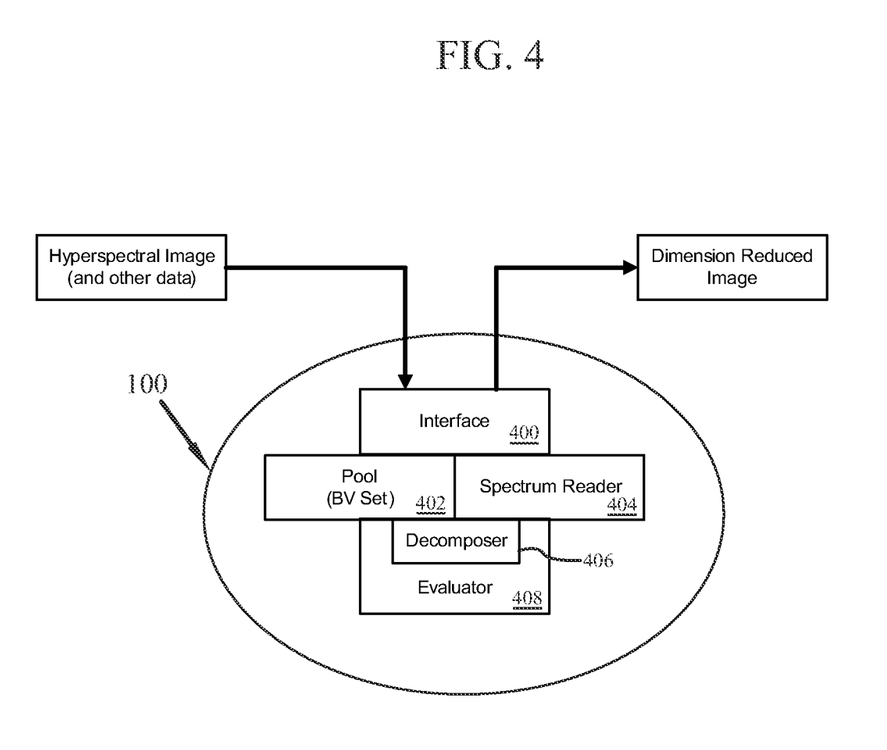
FIG. 4 is a high level block diagram presenting at least one method of hyperspectral image dimension reduction in accordance with at least one embodiment of the present invention.

FIG. 4 is a high level block diagram of the system architecture of the IDRS 100, in accordance with at least one embodiment. IDRS 100 may be implemented on a computer having typical components, such as a processor, memory, storage devices, and input and output devices. During operation, IDRS 100 may be maintained in active memory for enhanced speed and efficiency. In addition, in at least one embodiment, IDRS 100 may be operated on a computer network and may utilize distributed resources.

As shown in FIG. 4, for at least one embodiment, IDRS 100 includes an interface 400, a pool 402, a spectrum reader 404, a decomposer 406 and an evaluator 408. The interface is operable to receive information such as a hyperspectral image, a user provided basis vector, and/or other information such as for example, but not limited to, whether to perform the dimension reduction as a lossy or lossless operation. The interface may receive information directly from a user through an associated input device, or directly from a system component, such as the detectors 116 shown in FIG. 1.

With respect to the issue of image reduction as a lossless operation, it is understood that the resulting data may not qualify in general terms as compressed data, for the additional components added to the compressed element may in fact result in a data set that is substantially the same size as the original data set. However, it is possible for the compressed portion of the data to be sent, processed or otherwise utilized and to deliver other data elements at a later time. Moreover, it is possible to utilize a compressed lossy version of the data for immediate transfer to the ground, and still acquire the additional data elements so as to achieve lossless version at a later date. For these possible benefits, this option is intended to be provided to users of the system.

The pool 402 is in communication with the interface 400 and is operable to receive basis vectors from the interface, if provided by a user or built in as a default. More generally, the pool 402 is operable to provide at least one basis vector, and more commonly a set of basis vectors for use in dimensionally reducing the hyperspectral image. The spectrum reader 404 is operable to read and provide the spectral vector for each pixel of the hyperspectral image.

The decomposer 406 is coupled to both the pool 402, so as to receive the BV set, and the spectrum reader 404, so as to receive the spectral vector of a given pixel. The decomposer 406 is operable to decompose the spectral vector with the BV set and provide a result. In at least one embodiment the decomposer 406 is an unmixer. The evaluator 408 is in communication with at least the pool 402 and the decomposer 406. In a first instance, the evaluator is operable to compare the result, e.g., the magnitude of a residual vector, with a threshold. If the magnitude of the residual vector is over a threshold value then the evaluator 408 will direct the spectral vector be added to the pool 402, and more specifically the BV set. In a second instance, the evaluator 408 is operable to provide an alpha vector, a residual vector, and/or the magnitude of the residual vector for each pixel.

It is of course understood and appreciated that the components/elements of the IDRS 100 as identified above may be implemented with subcomponents of otherwise further subdivided. Each element has been illustrated as an identifiable element for ease of discussion and illustration. In addition, as indicated above, in at least one embodiment, IDRS 100 is implemented in a computer, environment, wherein the interface 400, the pool 402, the spectrum reader 404, the decomposer 406 and the evaluator 408 are implemented as routines, and/or objects rendered in a variety of different forms of code and instructions as may be preferred for different computer systems and environments.

Figure 5:
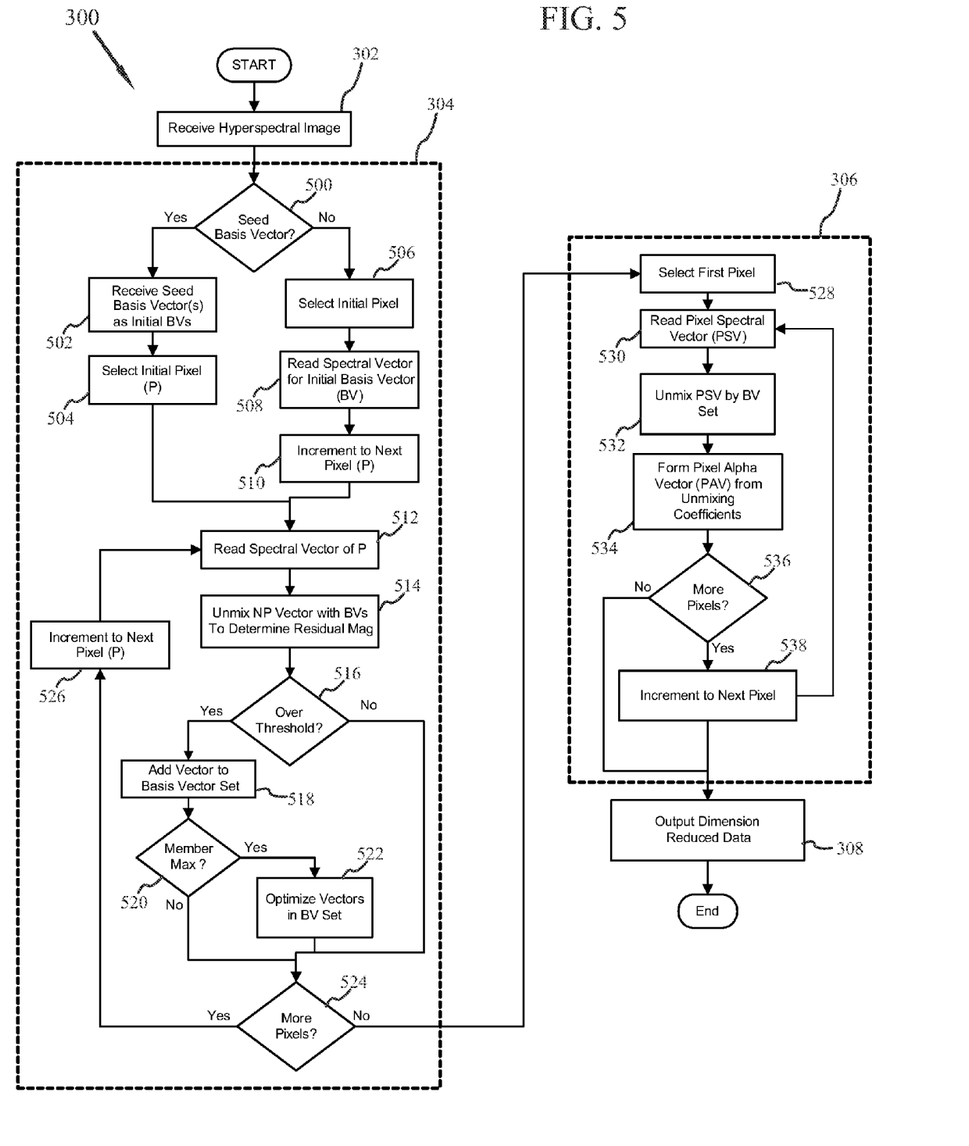
FIG. 5 is a more specific block diagram of a method of hyperspectral image dimension reduction in accordance with at least one embodiment of the present invention.

FIG. 5 provides a more specific block diagram of the method presented in FIG. 3. More specifically, FIG. 5 provides greater detail for the operations of developing the BV set, block 304, and generating the alpha vectors, block 306. Again it is understood and appreciated that the order of the steps herein described are provided for ease of illustration and discussion and not by way of limitation.

More specifically, as shown in FIG. 5, in at least one embodiment the process of developing the BV set commences with analysis of whether a seed basis vector has been provided, decision 500. Stated simply, the basis vector set provides a collection of spectral vectors by which the spectral vectors of all pixels within the hyperspectral image are evaluated. Whereas in at least one embodiment, the evaluation and comparison is based entirely upon data already present in the hyperspectral image itself, in at least one embodiment at least one basis vector is provided by an operator or is read from a default file. Such a basis vector may, for example, correspond to the spectral vector of a particular material known to exist or expected not to exist, within the geographic area from which the hyperspectral image was formed.

Where one or more seed vectors are provided as initial basis vectors, the seed basis vector(s) is received and added to the basis vector set 210, block 502. To develop the reset of the BV set, an initial pixel (P) is selected, block 504. Generally, and in at least one embodiment, the initial pixel is selected to be the first pixel in the top left or bottom left corner, the pixels to be compared in an incremental step pattern across each row X.

Where a seed vector is not provided, decision 500, an initial pixel is immediately selected, block 506. The spectral vector for this initial pixel is then read by the spectrum reader and this initial spectral vector is used as the initial basis vector for the further development of the BV set, block 508. In at least one embodiment, the selection of the initial pixel to determine the initial basis vector is a random selection. In at least one alternative embodiment, the initial pixel is selected to be either the top left or bottom left corner pixel.

Moreover, if a seed basis vector(s) is provided then it is treated as if it was the determined basis vector from an initial pixel and the process immediately commences with unmixing and testing as discussed below. If a seed basis vector is not provided, then a pixel is selected and its spectral vector is adopted as the initial basis vector, and then the process commences with unmixing and testing as set forth below.

With an initial basis vector so determined, the process increments to select the next pixel (P), block 510. Generally, and in at least one embodiment, it is understood and appreciated that the pixels will be incremented through in a left to right iteration for each row X.

The process now continues with the reading of the spectral vector of pixel P, block 512. The spectral vector of the selected pixel is then decomposed with the members of the developing BV set. In at least one embodiment the decomposition is performed by unmixing the spectral vector with the members of the BV set.

Generally stated, unmixing is understood and appreciated to be, in essence, an algebraic approach to decomposing the spectral vector into its component parts. For example, a spectral vector from a given pixel may comprise the spectrum elements indicative of grass, aluminum and sand, and thus be a composite spectral vector. When this vector is unmixed with vectors representative of aluminum and sand, the spectral vector of grass will be revealed. The unmixing process, block 514, provides alpha coefficients representative of the abundance of the basis vectors and will provide a residual vector. The vector that is unmixed is an algebraic combination of the basis vectors, weighted in some fashion by the alpha coefficients plus the residual vector.

In at least one embodiment, the magnitude of the residual vector is then determined, and is understood and appreciated to be derived from the square root of the dot product of the residual vector with itself, otherwise known as Euclidean distance provided by the equation:

$$\|x\| := \sqrt{\chi_1^2 + \ldots + \chi_n^2}.$$

where $x=[x_1, x_2, \ldots, x_n]$.

The magnitude of the residual vector is then evaluated with a threshold value, decision 516. In at least one embodiment the threshold value is provided by an operator. The threshold value may also be a pre-determined value that is hard coded into the method. If the magnitude is over the threshold, decision 516, the spectral vector is added to the BV set, block 518. In some embodiments, there may be a pre-determined maximum number of members of the BV set. When the total number of members is below this pre-determined maximum there is of course no issue and the new spectral vector is simply added to the BV set, decision 520.

If, however, the maximum number of members has been reached, the members of the BV set are optimized, block 522. Various optimization methods may be employed and in general the type of optimization strategy adopted is determined by an operator. These methods may include, but are not limited to, optimization to selection of the maximum spectral vectors (e.g., the spectral vectors having the greatest magnitudes), optimization to select the greatest range between the spectral vectors, optimization to select the spectral vectors closest to a spectral vector mean, optimization to select the spectral vectors closest to a spectral median.

In at least one embodiment, the residual magnitude is stored when a basis vector is added to the BV set. When the maximum number for the BV set is reached, the magnitude of a new residual must be larger than the smallest residual computed from the existing members of the BV set. If it is not, the new basis vector is not added. If it is, then the new basis vector is added and the basis vector that previously had the smallest residual is removed.

As indicated above, in at least one embodiment the user is permitted to provide seed basic vectors. In at least one such embodiment where the user has also set a maximum number for the BV set, the seed basis vector(s) are treated as special and maintained as core elements of the BV set. In one embodiment, this is achieved by tagging the seed vectors such that they are not considered in the elimination evaluation process. Moreover, in at least one embodiment the maximum number of BV set members does not include the seed basis vector(s). In an alternative embodiment, the maximum number of BV set members may indeed include the seed basis vector(s), but they are simply not included in the evaluation for removal process. As such, key factors that are indicated by the seed vector(s) are maintained within the BV set.

Having resolved the question of whether to add the residual vector to the BV set, and whether to optimize the BV set, the method continues to select the next pixel, decision 524. If indeed more pixels remain then the method will increment to the next pixel, block 526. It should be understood and appreciated that, although the incremental process is intended to be orderly, the type of incrementing—left to right, right to left, top to bottom, bottom to top, or random—is largely immaterial. The key element is that each pixel of the hyperspectral image is being evaluated so as to determine an appropriate set of basis vectors that are, in at least one embodiment, inherently tied to hyperspectral image itself.

With the BV set so established, the method now continues with the generation of the alpha vectors, block 306. As in the development of the BV set, the generation of the alpha vectors begins with the selection of an initial pixel, block 528. The spectral vector is then read from the selected pixel, block 530. The spectral vector is then decomposed with the BV set, block 532. In at least one embodiment the decomposition is performed as unmixing, as discussed above. It is to be realized that for each member of the BV set there will be a corresponding value, an unmixing coefficient. There will also be a residual vector.

For the given pixel, the unmixing coefficients represent an alpha vector for the given pixel, block 534. It is further understood and appreciated that the relative magnitude of dimension reduction is approximately the difference between the number of elements in a spectral vector originally present in the hyperspectral image and the number of members in the applied BV set. For example, if there were originally one-hundred spectral bands present in the hyperspectral image, and twenty basis vectors in the BV set, the dimension reduction represented by the alpha vectors would be about eighty or a factor of five.

The process is continued for each pixel, as indicated by the query to determine the presence of more pixels, decision 536, and the increment to the next pixel, block 538 and the return to read the spectral vector for the selected pixel, block 530. Moreover, all of the pixels in the hyperspectral image scene are unmixed with the BV set so as to provide vectors having g coefficients (corresponding to the number of members in the BV set) and a residual vector for each X-Y location.

When the generation of alpha vectors has been accomplished for all pixels of the hyperspectral image, the resulting set of alpha vectors is provided as the output scene, namely a dimensionally reduced hypercube. Because of the application of the BV set, which is derived from the spectral vectors of each pixel, to each pixel, the resulting information of each alpha vector has approximately the same information content as the original pixel. More specifically, the reduced alpha vector is still representative of the composite spectral frequencies present in the pixel, such a combination of grass, sand and metal as present in the original spectral vectors is still represented in the alpha vector. Furthermore, and quite advantageously, the dimensionally reduced image provided by the alpha pixels is suitable for processing without regeneration of the original image. Further, the maximum loss of information on any pixel is minimized compared to any other dimensionality reduction process. This is crucial when the image is processed for subtle changes, the presence of small targets or anomalies.

Decompression of the output image can be accomplished with the use of the BV set. As such, in at least one embodiment the BV set is provided as output with the dimension reduced image. The residual vectors, if left untreated are understood to be of the same size as the original data set. Calculating the magnitude for each residual vector greatly reduces the volume of the data once again.

Indeed, in at least one embodiment the magnitude of each residual vector is also determined and provided as output in addition to dimensionally reduced image represented by the alpha vectors. Moreover, it is understood and appreciated that in varying embodiments, the method 300 may provide: the alpha vectors, the magnitude of the residual vectors, the BV set, and combinations thereof. As such, it is understood that the method is adaptable to provide compression and dimension reduction options that range from lossy to lossless.

Figure 6:
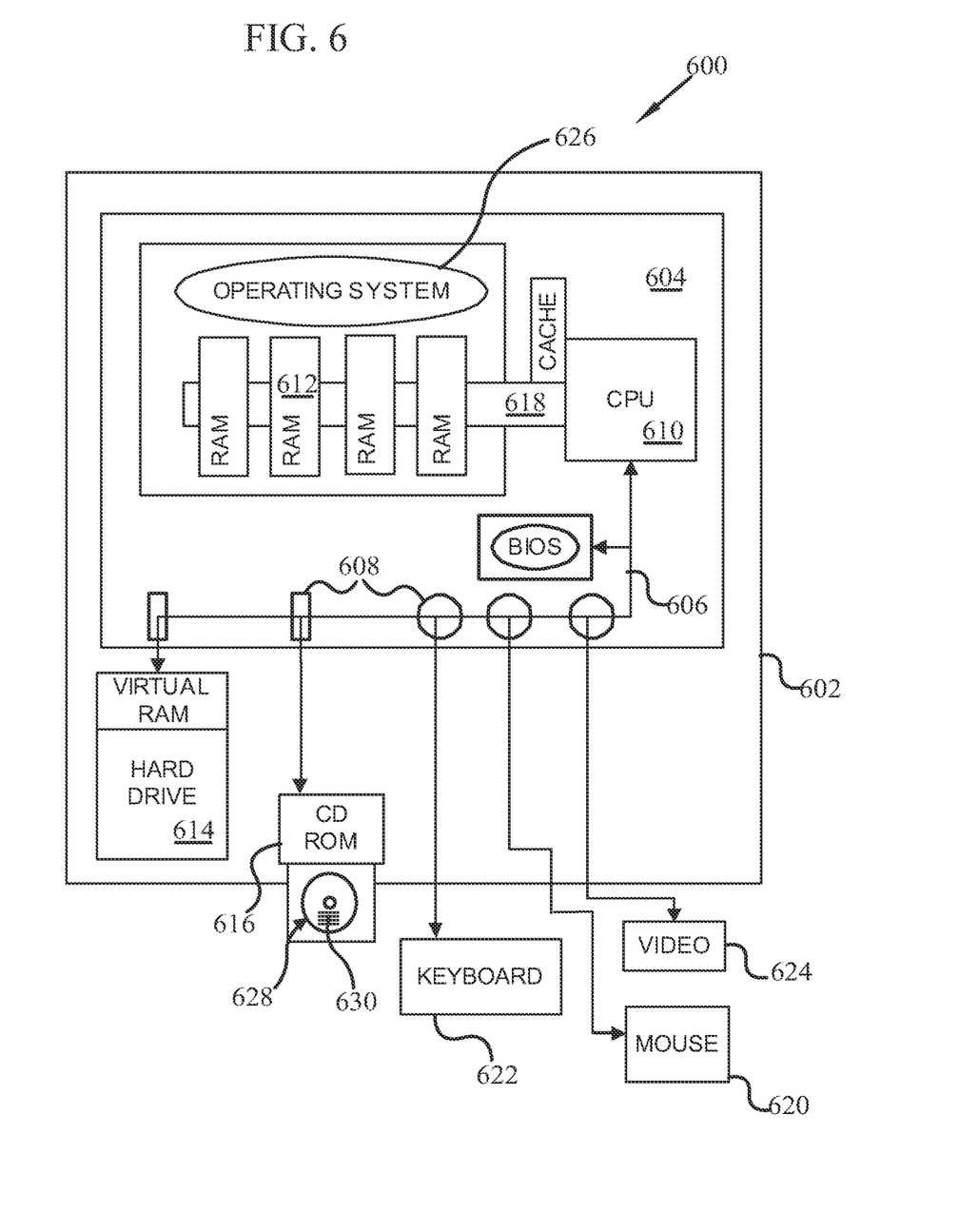
FIG. 6 is a block diagram of a computer system in accordance with one or more embodiments.

FIG. 6 is a high level block diagram of an exemplary computer system 600 as may be used to provide IDRS 100, and/or embodiments of method 300. Computer system 600 has a case 602, enclosing a main board 604. The main board has a system bus 606, connection ports 608, a processing unit, such as Central Processing Unit (CPU) 610, and a memory storage device, such as main memory 612, hard drive 614, and CD/DVD Rom drive 616.

Memory bus 618 couples main memory 612 to CPU 610. A system bus 606 couples hard drive 614, CD/DVD Rom drive 616, and connection ports 608 to CPU 610. Multiple input devices may be provided, such as for example a mouse 620 and keyboard 622. Multiple output devices may also be provided, such as for example a video monitor 624 and a printer (not shown).

Computer system 600 may be a commercially available system, such as a desktop workstation unit provided by IBM, Dell Computers, Gateway, Apple, Sun Micro Systems, or other computer system provider. Computer system 600 may also be a networked computer system, wherein memory storage components such as hard drive 614, additional CPUs 610 and output devices such as printers are provided by physically separate computer systems commonly tied together in the network. Those skilled in the art will understand and appreciate the physical composition of components and component interconnections comprising computer system 600, and select a computer system 600 suitable for the schedules to be established and maintained.

When computer system 600 is activated, preferably an operating system 626 will load into main memory 612 as part of the boot strap startup sequence and ready the computer system 600 for operation. At the simplest level, and in the most general sense, the tasks of an operating system fall into specific categories—process management, device management (including application and user interface management) and memory management.

In such a computer system 600, the CPU 610 is operable to perform one or more of the scheduling embodiments described above. Those skilled in the art will understand that a computer-readable medium 628 on which is a computer program 630 for adding activities to a schedule may be provided to the computer system 600. The form of the medium 628 and language of the program 630 are understood to be appropriate for computer system 600. Utilizing the memory stores, such as for example one or more hard drives 614 and main system memory 612, the operable CPU 602 will read the instructions provided by the computer program 630 and operate to perform the method of hyperspectral image dimension reduction 300 as described above.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed:

1. A method of hyperspectral image dimension reduction, comprising:
   receiving a hyperspectral image having a plurality of pixels;
   establishing a basis vector (BV) set;
   for each of the plurality of pixels:
      reading a spectral vector from the pixel;
      decomposing the spectral vector with the BV set to provide a reduced dimension vector for the pixel; and
   providing a dimension reduced image comprising the reduced dimension vectors for each pixel;
   wherein establishing the basis vector (BV) set includes:
      selecting an initial pixel;
      reading the spectral vector for the initial pixel, the spectral vector assigned as an initial basis vector (BV) of the set; and
      for each of the remaining plurality of pixels:
         reading a spectral vector from the pixel;
         unmixing the spectral vector with the BV set to determine a residual vector; and
         in response to a magnitude of the residual vector being greater than a threshold, adding the spectral vector to the BV set;
   wherein the BV set has a pre-determined maximum number of members, and in response to an attempt to exceed the maximum number, optimizing the set to maintain the maximum number of spectral vectors;
   wherein the BV set is optimized to maintain the pre-determined maximum number of members; and
   wherein for optimization, when the maximum number for the BV set is reached, a residual magnitude of a new candidate vector is compared to residual magnitude values of BV set members, the new candidate replacing a BV set member in response to the residual magnitude of the new candidate being larger than a smallest residual computed from the existing BV set member.

2. The method of claim 1, wherein the BV set is provided with the dimension reduced image.

3. The method of claim 1, wherein decomposing the spectral vector with the BV set further includes providing a residual vector for the pixel.

4. The method of claim 3, wherein at least the magnitude of the residual vector is also provided with the dimension reduced image.

5. The method of claim 4, wherein the basis vector set is provided with the dimension reduced image.

6. The method of claim 1, wherein the dimension reduction is performed as a lossy process.

7. The method of claim 1, wherein the dimension reduction is performed as a lossless process.

8. The method of claim 1, wherein the dimension reduced image includes an alpha vector and a residual vector for each pixel.

9. The method of claim 1, wherein establishing a basis vector (BV) set includes receiving at least one pre-determined basis vector.

10. The method of claim 1, wherein the threshold is provided by an operator along with the hyperspectral image.

11. The method of claim claim 1, wherein the pre-determined maximum number of members is provided by an operator along with the hyperspectral image.

12. The method of claim 1, wherein said basis vector set comprises at least one basis vector having no physical interpretation.

13. The method of claim 1, wherein said establishing the BV set is configured to minimize error associated with each of the plurality of pixels.

* * * * *